United States Patent
Teragawa (10) Patent No.: US 10,451,922 B2
(45) Date of Patent: Oct. 22, 2019

(54) LIGHTING DEVICE INCLUDING DIFFUSION LENSES ASSOCIATED WITH HOLLOW CYLINDRICAL LIGHT GUIDE PORTIONS, AND DISPLAY DEVICE INCLUDING THE LIGHTING DEVICE

(71) Applicant: Sakai Display Products Corporation, Sakai-shi, Osaka (JP)

(72) Inventor: Daisuke Teragawa, Sakai (JP)

(73) Assignee: SAKAI DISPLAY PRODUCTS CORPORATION, Osaka (JP)

( * ) Notice: Subject to any disclaimer, the term of this patent is extended or adjusted under 35 U.S.C. 154(b) by 239 days.

(21) Appl. No.: 15/617,051

(22) Filed: Jun. 8, 2017

(65) Prior Publication Data
US 2017/0269431 A1    Sep. 21, 2017

Related U.S. Application Data

(63) Continuation of application No. PCT/JP2014/082885, filed on Dec. 11, 2014.

(51) Int. Cl.
*F21V 8/00* (2006.01)
*G02F 1/1335* (2006.01)

(52) U.S. Cl.
CPC ..... *G02F 1/133606* (2013.01); *G02B 6/0096* (2013.01); *G02F 1/133603* (2013.01);
(Continued)

(58) Field of Classification Search
CPC ......... G02F 1/133606; G02F 1/133603; G02F 2001/133607; G02F 2001/133628; G02B 6/0096
See application file for complete search history.

(56) References Cited

U.S. PATENT DOCUMENTS 9,316,385 B2 *   4/2016   Maeda ................... F21V 29/00
2005/0213344 A1   9/2005   Inamoto
(Continued)

FOREIGN PATENT DOCUMENTS

JP    2000-162445 A    6/2000
JP    2005-283918 A    10/2005
(Continued)

OTHER PUBLICATIONS

Official Communication issued in International Patent Application No. PCT/JP2014/082885, dated Mar. 17, 2015.

*Primary Examiner* — Alan B Cariaso
(74) *Attorney, Agent, or Firm* — Keating & Bennett, LLP (57) ABSTRACT

A lighting device has a housing having a bottom part and an opening, the bottom part being formed with through holes, and a substrate having light sources mounted on one surface thereof, the substrate being placed outside of the bottom part of the housing such that light emitted from the light sources is passed through the respective through holes and radiated to the opening of the housing. The lighting device also has light guide parts, each of which has a cylindrical shape, inserted through the through holes of the bottom part of the housing for guiding the light emitted from the light sources, respectively, and diffusion lenses provided inside of the housing for diffusing the light guided by the light guide parts, respectively. Each of the light guide parts is hollow and configured to reflect the light by an inner surface thereof so as to guide reflected light to an associated diffusion lens.

12 Claims, 8 Drawing Sheets

(52) U.S. Cl.
CPC ............ *G02F 2001/133607* (2013.01); *G02F 2001/133628* (2013.01)

(56) References Cited

U.S. PATENT DOCUMENTS

| | | | |
|---|---|---|---|
| 2008/0316750 A1* | 12/2008 | Park | G02F 1/133603 362/294 |
| 2009/0066878 A1* | 3/2009 | Ogiro | G02F 1/133611 349/62 |
| 2009/0135330 A1 | 5/2009 | Kawase et al. | |
| 2009/0268128 A1* | 10/2009 | Yamada | G02B 3/06 349/67 |
| 2013/0301241 A1 | 11/2013 | Maeda | |
| 2015/0219831 A1 | 8/2015 | Tanaka | |

FOREIGN PATENT DOCUMENTS

| | | |
|---|---|---|
| JP | 2008-041645 A | 2/2008 |
| JP | 2009-129707 A | 6/2009 |
| JP | 3170078 U | 9/2011 |
| JP | 2012-032722 A | 2/2012 |
| WO | 2012/102163 A1 | 8/2012 |
| WO | 2014/050651 A1 | 4/2014 |

\* cited by examiner

FLOW OF AIR

Fig.9

FLOW OF AIR

LIGHTING DEVICE INCLUDING DIFFUSION LENSES ASSOCIATED WITH HOLLOW CYLINDRICAL LIGHT GUIDE PORTIONS, AND DISPLAY DEVICE INCLUDING THE LIGHTING DEVICE

CROSS REFERENCE TO RELATED APPLICATIONS

The present application is a continuation application of International Application No. PCT/JP2014/082885, filed Dec. 11, 2014.

BACKGROUND OF THE INVENTION

1. Field of the Invention

The present invention relates to lighting devices, and display devices having a lighting device and a light transmission type display panel.

2. Description of the Related Art

An example of the display devices is a liquid crystal display ("LCD") device. The LCD device includes a liquid crystal panel, and a backlight (i.e., a lighting device) to irradiate the liquid crystal panel with light. The liquid crystal panel displays images on its front by changing the transmittance of the light coming from the backlight. The backlight includes light sources and a housing for confining light emitted from the light sources. Generally, backlights are roughly classified into an edge light type and a direct type according to positions where the light sources are arranged. In LCD devices having a direct type backlight, a plurality of light sources are arranged directly under, i.e., directly on the rear side of, a liquid crystal panel, and a diffusion plate and an optical sheet for diffusing light are arranged between the light sources and the liquid crystal panel. Direct-lit LCD devices are advantageously capable of enhancing contrast of displayed images through local light quantity control of a plurality of light sources. Therefore, LCD devices of this type are adopted widely, in particular for applications in which high image quality is required.

When images are displayed on the liquid crystal display device, heat is generated from the light sources of the backlight. If the generated heat is not sufficiently discharged to the outside of the housing, temperature of the diffusion plate, the optical sheet, and/or the liquid crystal panel increases. In such a case, disadvantageously, the diffusion plate and the optical sheet would be deformed by thermal expansion, and/or liquid crystal molecules filled in the liquid crystal panel would be denatured by the increased temperature, leading to occurrence of display defects.

JP 2009-129707 A discloses an LCD device in which a light source substrate mounted with light sources and a drive substrate for driving the light sources are attached to a bottom chassis made of metal having high thermal conductivity, the bottom chassis being a part of a housing, so as to discharge heat generated from the light source substrate and the drive substrate via the bottom chassis to the outside of the housing.

When LCD devices are used for digital signages (electronic signboards), for example, they may be required to have improved luminance, or brightness, in order to enhance the visibility or legibility of images which are displayed outdoor, or in a building illuminated by high-brightness illumination. To increase the luminance of the LCD devices, it is necessary to increase a current to be inputted to the light sources included in the backlight to thereby increase the emission intensity of the light sources.

However, increasing of the current to be inputted to the light sources to increase the emission intensity of the light sources causes simultaneous increase of an amount of heat generated from the light sources. In such a case, with the LCD device as disclosed in JP 2009-129707 A, heat generated from the light sources would not be sufficiently discharged to the outside of the casing, so that the temperature of the diffusion plate, the optical sheet, and/or the liquid crystal panel would increase and display defects would occur. Thus, in the liquid crystal display device of JP 2009-129707 A, it is difficult to increase the luminance without causing display defects.

There are, therefore, a need for lighting devices which can efficiently discharge heat generated from light sources to the outside of a housing, and a need for display devices which can increase luminance without causing display defects.

SUMMARY OF THE INVENTION

According to an aspect of the present invention, there is provided a lighting device including:

a housing having a bottom part and an opening, the bottom part being formed with through holes;

a substrate having light sources mounted on one surface thereof, the substrate being placed outside of the bottom part of the housing such that light emitted from the light sources is passed through the respective through holes and radiated to the opening of the housing;

light guide parts, each of which has a cylindrical shape, inserted through the through holes of the bottom part of the housing for guiding the light emitted from the light sources, respectively; and diffusion lenses provided inside of the housing for diffusing the light guided by the light guide parts, respectively, wherein each of the light guide parts is hollow and configured to reflect the light by an inner surface thereof so as to guide reflected light to an associated diffusion lens.

With this arrangement, since the substrate with the light sources is placed outside of the bottom part of the housing, heat generated from the light sources is discharged outside of the housing. Light emitted from the light sources is passed through the respective through holes to the opening of the housing. Thus, increase of temperature inside of the housing is suppressed.

Furthermore, light emitted from the light sources and guided by the respective light guide parts is diffused uniformly and radiated by the diffusion lenses. Thus, unevenness in luminance of radiated light is suppressed.

In addition, the through holes are closed by the respective light guide parts inserted therethrough, so that intrusion of dust into the through holes is prevented. Also, since the light guide parts are hollow, the inside of the light guide parts is filled with air. Due to the heat insulating effect of the air, the light guide parts have low thermal conductivity. Therefore, heat generated from the light sources is suppressed from being transferred to the inside of the housing.

In one embodiment, the lighting device may have a heat insulating material provided between the housing and the substrate.

In this embodiment, transfer of the heat generated from the light sources to the inside of the housing can be further suppressed by the heat insulating material.

In one embodiment, the lighting device may have a radiator that is in contact with another surface of the substrate opposite to the one surface of the substrate.

In this embodiment, heat generated from the light sources is discharged mainly in the direction of the another surface of the substrate by the radiator provided at the another surface of the substrate. This reduces an amount of heat to be radiated toward the inside of the housing, so that transfer of the heat generated from the light sources to the inside of the housing can be further suppressed.

In one embodiment, the radiator may have a base in contact with the substrate, and radiating fins formed on the base in an erected manner.

In this embodiment, when the light device is placed such that the radiating fins extend vertically, heated air flows upwards through between the radiating fins, whereby efficient heat exchange is performed between the substrate and air and the substrate is efficiently cooled. As a result, transfer of heat generated from the light sources to the inside of the housing can be further suppressed.

In one embodiment, the radiator may have a base in contact with the substrate, and radiating pins formed on the base in an erected manner.

In this embodiment, air flows between the radiating pins in whatever orientation the lighting device is placed. Therefore, the substrate is efficiently cooled irrespective of the orientation of the lighting device. As a result, transfer of heat generated from the light sources to the inside of the housing can be further suppressed.

In one embodiment, a treatment for enhancing heat radiation may be applied to another surface of the substrate opposite to the one surface of the substrate.

In this embodiment, heat generated from the light sources is discharged mainly in the direction of the another surface of the substrate due to the treatment applied to the another surface of the substrate. This reduces an amount of heat to be radiated toward the inside of the housing, so that transfer of the heat generated from the light sources to the inside of the housing can be further suppressed.

In one embodiment, the substrate may be formed of metal.

In this embodiment, the substrate formed of metal has high thermal conductivity, so that heat generated from the light sources are efficiently discharged via the substrate. As a result, transfer of the heat generated from the light sources to the inside of the housing can be further suppressed.

According to another aspect of the invention, there is provided a display device including:

the above-described lighting device; and a display panel provided so as to close the opening of the housing of the lighting device and configured to control transmittance of light emitted from the light sources so as to display an image.

In the display device, the display panel is provided at the opening of the housing of the lighting device. Owing to the arrangement and configuration of the lighting device, heat transfer to the inside of the housing is suppressed, so that increase of temperature of the display panel is suppressed.

Thus, it is possible to enhance the luminance of the display device without causing display defects.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein.

DETAILED DESCRIPTION OF THE INVENTION

The present invention will be described in detail below referring to the attached drawings showing various embodiments.

(Embodiment 1)

Figure 1:
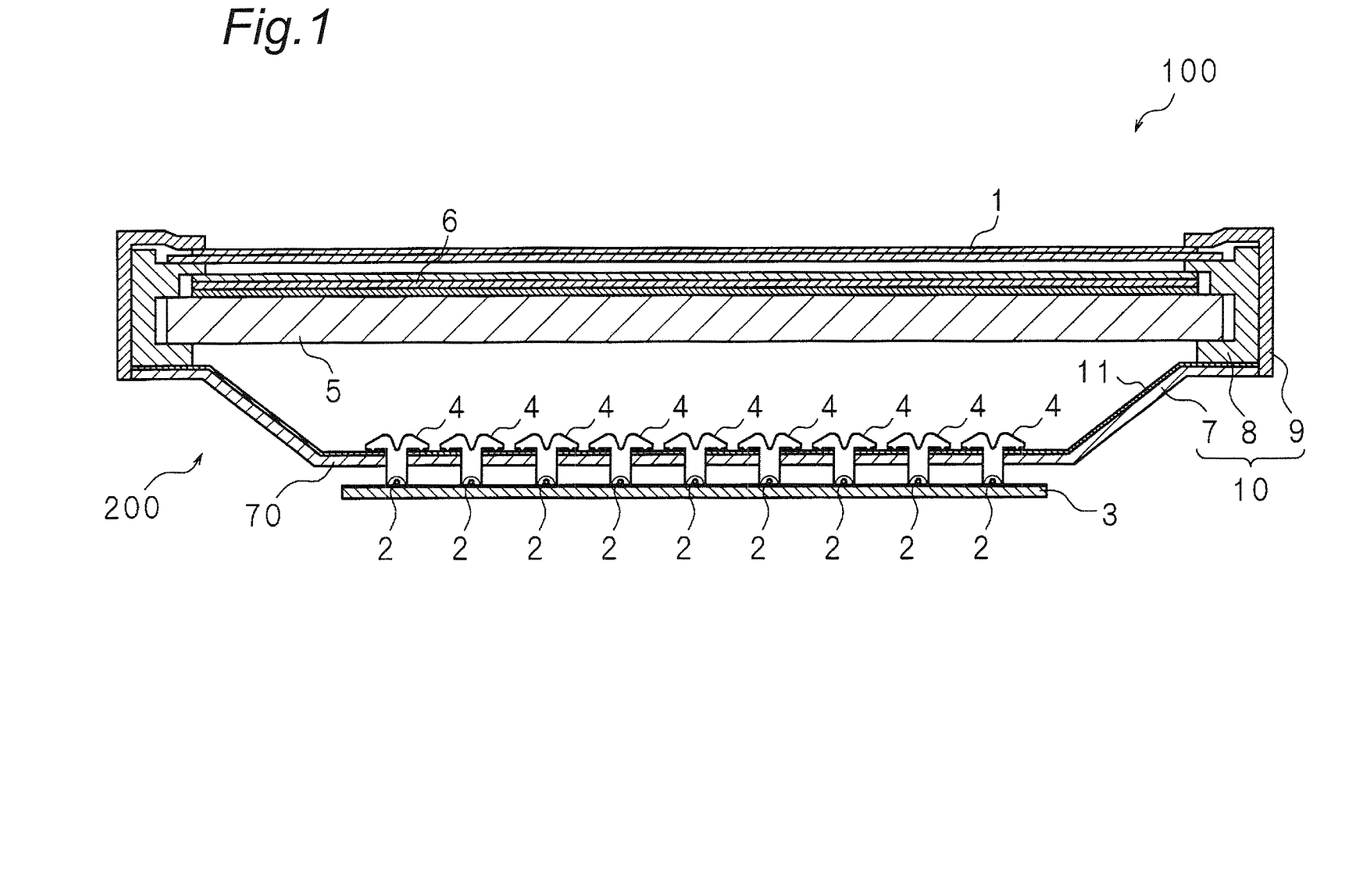
FIG. 1 is a side cross-sectional view of a display device according to Embodiment 1.

FIG. 1 is a side cross-sectional view of a display device 100 according to Embodiment 1. The display device according to this embodiment is an LCD device. The display device 100 includes a liquid crystal panel 1 which is a display panel, and a backlight 200 for irradiating the liquid crystal panel 1 with light.

The backlight 200 has a plurality of light emitting diodes ("LEDs") 2 as light sources. The LEDs 2 are mounted on one surface (which is a mounting surface) of a substrate 3 so as to be arrayed vertically and horizontally. Preferably, the substrate 3 is formed of a metal with high heat dissipation, such as aluminum. The mounting surface of the substrate 3 is formed with wiring traces consisting of copper foil pattern 30 for conducting current to the LEDs 2 (see FIG. 2). The wiring traces consisting of the copper foil pattern 30 are connected to a drive circuit (not shown) provided outside the substrate 3. The LEDs 2 emit light by converting electric power supplied from the drive circuit into light. The mounting surface is opposed to the liquid crystal panel 1.

The liquid crystal panel 1 has a laminated structure in which a liquid crystal material is contained between two opposed glass substrates, and two polarizing plates are provided so as to sandwich the two glass substrates. The liquid crystal panel 1 is configured such that voltage across the glass substrates is controlled pixel by pixel so as to change orientation of molecules of the liquid crystal material and that twist of a polarization plane of light passing through the two polarizing plates is controlled so as to control transmittance of the light pixel by pixel.

The backlight 200 has a back chassis 7. As shown in FIG. 1, the back chassis 7 has a rectangular bottom part 70, side plates which are raised obliquely from a perimeter of the bottom part 70, and a rectangular frame-like edge part extending from the side plates parallel to the bottom part 70. The bottom part 70 is formed with a plurality of through-holes 71 of, for example, a circular shape (see FIG. 2), which are arrayed vertically and horizontally at intervals equal to those at which the LEDs 2 are arrayed on the substrate 3.

An inner surface of the bottom part 70, inner surfaces of the side plates, and a surface of the edge part connected to those inner surfaces of the side plates will be generally referred to as an inner surface of the back chassis 7 below. A surface of the back chassis 7 opposite to the inner surface thereof will be referred to as an outer surface of the chassis 7.

A reflection sheet 11 for reflecting light is attached to the substantially entire inner surface of the back chassis 7 except where the through holes 71 (see FIG. 2) are provided.

Figure 2:
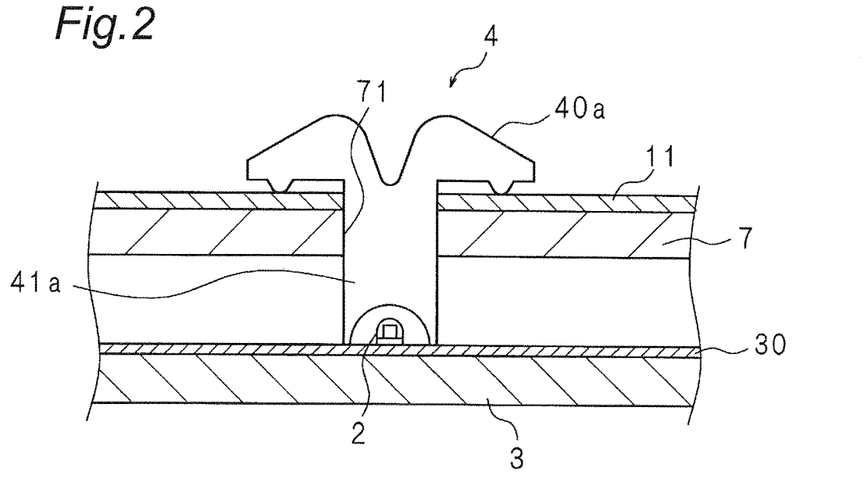
FIG. 2 is an enlarged side cross-sectional view of a part of the display device according to Embodiment 1, the part including a part of a back chassis including a through hole and its vicinity.

FIG. 2 is an enlarged side cross-sectional view of a part of the display device 100 according to Embodiment 1, the part including a part of the back chassis 7 including a through hole 71 and its vicinity. Guide and diffusion lenses 4 are attached to the respective through holes 71, as shown in FIGS. 1 and 2. Each guide and diffusion lens 4 has a generally mushroom-like shape, and includes a diffusion lens part 40a that entirely covers a corresponding through-hole 71, and a cylindrical light guide part 41a protruding from one surface of the diffusion lens part 40a. The light guide part 41a has a diameter that is equal to or slightly smaller than an inner diameter of the through-hole 71. The guide and diffusion lenses 4 are made of, for example, a transparent resin. The diffusion lens part 40a of each guide and diffusion lens 4 is provided inside the back chassis 7 and the light guide part 41a is inserted in and extends through a corresponding through-hole 71 such that a part of the light guide part 41a protrudes to the outside of the bottom part 70.

Positions of the through-holes 71 in the bottom part 70 correspond to positions of the LEDs 2 on the substrate 3. The substrate 3 is provided outside of the bottom part 70, with the LEDs 2 being opposed to the corresponding light guide parts 41a in the respective holes 71. A recessed part is formed on one end of the light guide part 41a opposite to another end where the diffusion lens part 40a is placed, and a peripheral part around the recessed part is in contact with the substrate 3 and surrounds a corresponding LED 2 on the substrate 3. As a result, each of the LEDs 2 is placed within a space defined by the mounting surface of the substrate 3 and the recessed part of the corresponding light guide part 41a. Because the light guide parts 41a protrude from the bottom part 70, the substrate 3 is spaced from the back chassis 7. The substrate 3 may be, for example, screwed to the bottom part 70.

In an example of FIG. 2, the diffusion lens part 40a and the light guide part 41a of the guide and diffusion lens 4 are formed in one piece. But, the diffusion lens part 40a and the light guide part 41a may be formed as separate components.

A rectangular frame-shaped panel chassis 8 having an external shape substantially same as that of the back chassis 7 is joined on an inner surface side of an edge part of the back chassis 7 with the outer peripheries of the back chassis 7 and the panel chassis 8 being coincident with each other.

A groove is formed circumferentially on the inner periphery of the panel chassis 8 and a rectangular diffusion plate 5 is fitted in the groove so as to be placed in parallel with the bottom part 70. The diffusion plate 5 is formed of a transparent resin material, such as acrylic, for example, which is mixed with a light diffusing agent. The diffusion plate 5 further diffuses, within it, light that is radiated from the guide and diffusion lens 4 on the bottom 70 and incident upon one surface, specifically, a rear surface, of the diffusion plate 5. The diffusion plate 5 radiates the internally diffused light from its front surface opposite to the rear surface.

An optical sheet laminate 6 is provided on the front side of the diffusion plate 5. The optical sheet laminate 6 includes one transparent diffusion sheet for diffusing incident light to provide uniform luminance and two transparent prism sheets for aligning the incident light in the normal direction of the prism sheets, wherein the transparent diffusion sheet and the transparent prism sheets are stacked on one another.

The liquid crystal panel 1 slightly larger than an opening of the panel chassis 8 is provided on the front side of the panel chassis 8 so as to entirely cover the opening of the panel chassis 8. An edge part of the liquid crystal panel 1 is in contact with a front surface of the panel chassis 8. Of two main surfaces of the liquid crystal panel 1, one surface farther from the back chassis 7 and the panel chassis 8 is a display surface for displaying images.

A rectangular frame-like bezel 9 having an L-shaped cross section is provided so as to cover the outer peripheral surface of the panel chassis 8 and the edge part of the liquid crystal panel 1. That is, the liquid crystal panel 1 is clamped by the panel chassis 8 and the bezel 9.

The back chassis 7, the panel chassis 8, and the bezel 9 constitute a housing 10 whose one face is opened.

In the display device 100 having the above configuration, light emitted from each of the plurality of LEDs 2 reaches a corresponding diffusion lens part 40a through a corresponding diffusion lens part 40a, and is diffused and radiated into the housing by the diffusion lens part 40a. The plurality of guide and diffusion lenses 4 diffuse light emitted from respective LEDs 2, so that the light to enter into the housing 10 is made uniform as a whole. Then, the diffusion plate 5 is irradiated with the light coming from the diffusion lenses 4 directly or through reflection by the reflection sheet 11.

The irradiation light is incident on the diffusion plate 5 from the rear surface thereof, then diffused in the inside of the diffusion plate 5 to be made more uniform, and finally radiated from the front surface thereof.

The light made uniform and radiated by the diffusion plate 5 enters the optical sheet laminate 6. As described above, the light entering the optical sheet laminate 6 is further diffused to be more uniform, and also aligned in the normal direction of the optical sheet laminate 6.

The light emitted from the optical sheet laminate 6 enters the liquid crystal panel 1 through its rear surface. The liquid crystal panel 1 is configured such that transmittance of the light is controlled pixel by pixel in accordance with a signal input from a control circuit (not shown) and an image corresponding to the input signal is displayed on the display surface.

As described above, in order to display images on the display device 100, it is necessary to supply electric power to the LEDs 2 to make the LEDs 2 emit light. At that time, a part of the electric power supplied to the LEDs 2 is discharged as heat. In the display device 100 of this embodiment, the substrate 3 is provided outside the housing 10 so as to be spaced and separated from the housing 10. Therefore, a large part of heat emitted from the LEDs 2 is discharged outside of the housing 10 and is hardly transferred to the inside of the housing 10. As a result of this, increase of the temperature in the diffusion plate 5, the optical sheet laminate 6, and the liquid crystal panel 1 is suppressed, so that thermal deformation of the diffusion plate 5 and the optical sheet laminate 6 and denaturalization of the liquid crystals filled in the liquid crystal panel 1 due to the increased temperature thereof are suppressed. Therefore, the LEDs are allowed to be supplied with as much electric power as possible so far as display defects are not caused, and emit light at a higher intensity, which allows the liquid crystal panel 1 to display images at a higher luminance. Thus, the visibility or legibility of the displayed images is improved.

In the display device 100 of this embodiment, the through holes 71 in the back chassis 7 are closed or occluded by the light guide parts 41a inserted in the respective through holes 71. Therefore, intrusion of dust into the housing 10, which would cause malfunction of the display device, is prevented. In addition, since the guide and diffusion lenses 4 are attached to the back chassis 7, when replacing the substrate 3 because of a failure in LEDs and/or the substrate 3 itself, the guide and diffusion lenses 4 are not required to be replaced, which facilitate repair operations.

(Embodiment 2)

Figure 3:
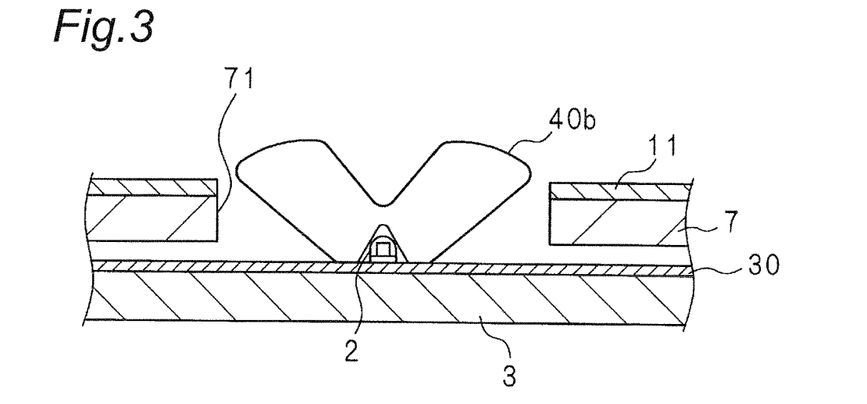
FIG. 3 is an enlarged side cross-sectional view of a part of a display device according to Embodiment 2, the part including an LED and its vicinity.
Figure 4:
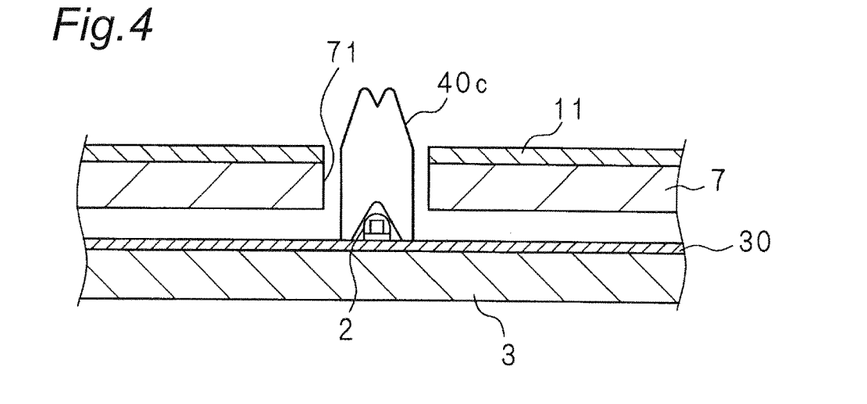
FIG. 4 is an enlarged side cross-sectional view of a part of a display device according to Embodiment 2, the part including an LED and its vicinity.

FIGS. 3 and 4 are enlarged side cross-sectional views of a part of display devices 100 according to Embodiment 2, the part including an LED 2 and its vicinity. As shown in FIGS. 3 and 4, in this embodiment, each light guide and diffusion lens 4 for diffusing light emitted from a corresponding LED 2 does not have a light guide part and consists of a diffusion lens part 40b or 40c. The diffusion lens parts 40b or 40c are attached to the substrate 3 in such a manner as to cover the respective LEDs 2 mounted on the substrate 3. The substrate 3 is placed such that the diffusion lens parts 40b or 40c are received in the respective through holes 71. With this structure, light emitted from the LEDs 2 is diffused and made uniform by the diffusion lens parts 40b or 40c. The light then enters the diffusion plate 5, passes through the diffusion plate 5 and the optical sheet laminate 6, and finally enters the liquid crystal panel 1.

In this embodiment, the substrate 3 is provided outside of the housing 10 so as to be separated and spaced from the housing 10, as in Embodiment 1. Therefore, heat emitted from the LEDs 2 is hardly transferred to the inside of the housing 10. Thus, the liquid crystal panel 1 is allowed to display images at a higher luminance to an extent that display defects are not caused, whereby the visibility or legibility of the displayed images is improved.

The other configurations of this embodiment are same as or similar to those of Embodiment 1, and description thereof is omitted here.

(Embodiment 3)

Figure 5:
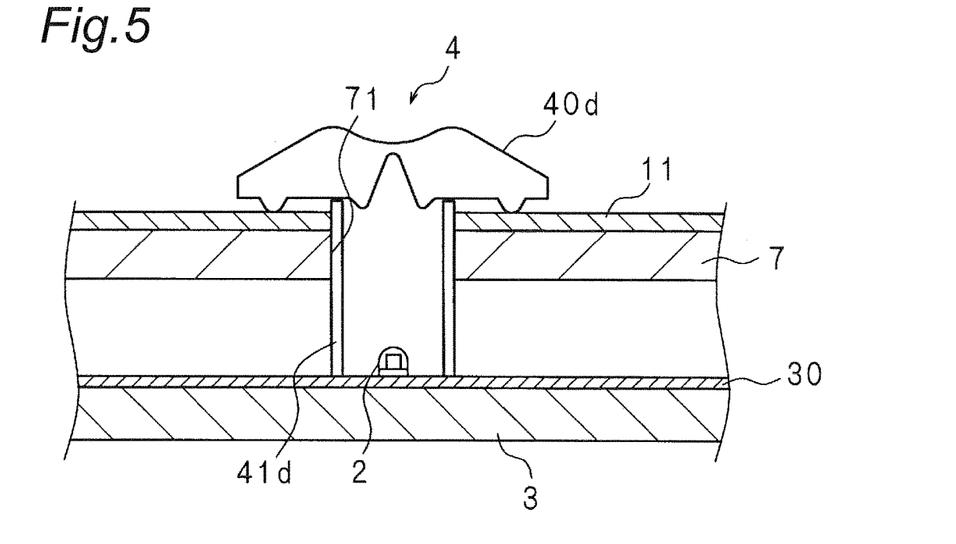
FIG. 5 is an enlarged side cross-sectional view of a part of a display device according to Embodiment 3, the part including an LED and its vicinity.

FIG. 5 is an enlarged side cross-sectional view of a part of a display device 100 according to Embodiment 3, the part including an LED 2 and its vicinity. In this embodiment, in each light guide and diffusion lens 4, a light guide part 41d is formed in a shape of a hollow cylinder with an open end opposite to an end where an associated diffusion lens part 40d is placed. The hollow-cylinder shaped light guide parts 41d are inserted through the respective through holes 71. The light guide parts 41d have an outer diameter equal to or slightly smaller than the inner diameter of the through holes 71, as in Embodiment 1. The open ends of the light guide parts 41d are in contact with the substrate 3, surrounding the respective LEDs 2.

The light guide parts 41d in this embodiment are formed of, for example, light-reflecting material, so that light emitted by each LED 2 is reflected by an inner surface of the corresponding light guide part 41d while being guided to the associated diffusion lens part 40d. The hollow cylinder of the light guide part 41D is filled with air. Due to the heat insulating effect of the air, the light guide parts 40d in this embodiment hardly transfer heat, as compared with the light guide parts, which are not hollow, of Embodiment 1. Thus, heat emitted from the LEDs 2 is hardly transferred to the diffusion plate 5, the optical sheet laminate 6, and the liquid crystal panel 1, as a result of which increase of the temperature in these components is further suppressible.

The other configurations of this embodiment are same as or similar to those of the preceding embodiments, and description thereof is omitted here.

(Embodiment 4)

Figure 6:
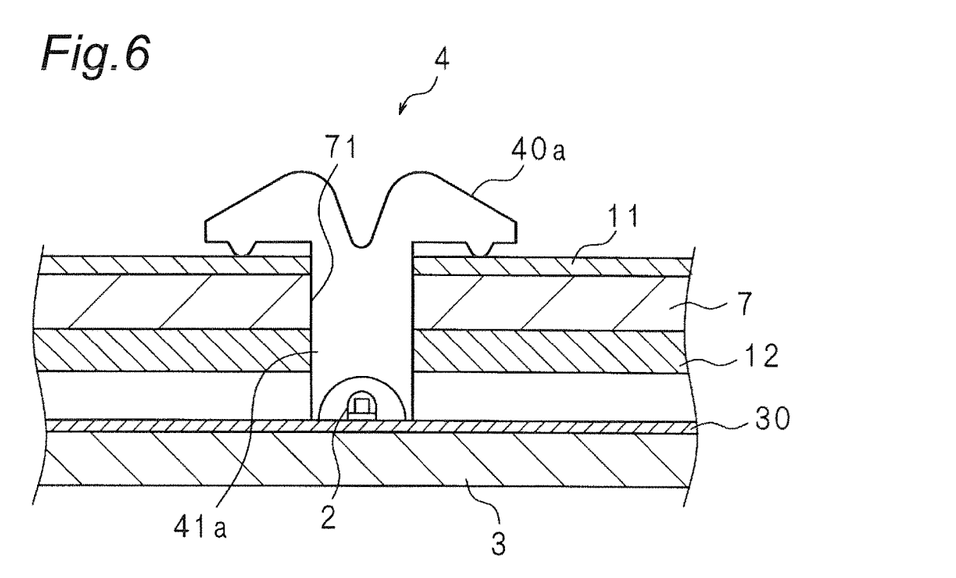
FIG. 6 is an enlarged side cross-sectional view of a part of a display device according to Embodiment 4, the part including an LED and its vicinity.

FIG. 6 is an enlarged side cross-sectional view of a part of a display device 100 according to Embodiment 4, the part including an LED 2 and its vicinity. In the display device 100 according to this embodiment, a sheet-shaped heat insulating material 12 is provided between the back chassis 7 and the substrate 3. The heat insulating material 12 is attached or stuck to the substantially entire outer surface of the bottom part 70 except for the through holes 71. Alternatively, a plurality of strips of heat insulating material 12 may be attached or stuck, in parallel with each other, to the outer surface of the bottom part 70 in regions of the bottom part 70 in which no through holes 71 are present. In both cases the heat insulating material 12 does not close the through holes 71 in the bottom part 70. The heat insulating material 12 may be bonded to the bottom part using, for example, an adhesive.

In the display device 100 of this embodiment, because the heat insulating material 12 is provided between the back chassis 7 and the substrate 3, heat generated from the LEDs 2 is further suppressed from being transferred to the inside of the housing 10, and thus, increase of the temperature in the diffusion plate 5, the optical sheet laminate 6 and the liquid crystal panel 1 is further suppressible, as compared with the preceding embodiments. Thus, the liquid crystal panel 1 is allowed to display images at a higher luminance to an extent that display defects are not caused, whereby the visibility or legibility of the displayed images is improved.

The other configurations of this embodiment are same as or similar to those of the preceding embodiments, and description thereof is omitted here.

(Embodiment 5)

Figure 7:
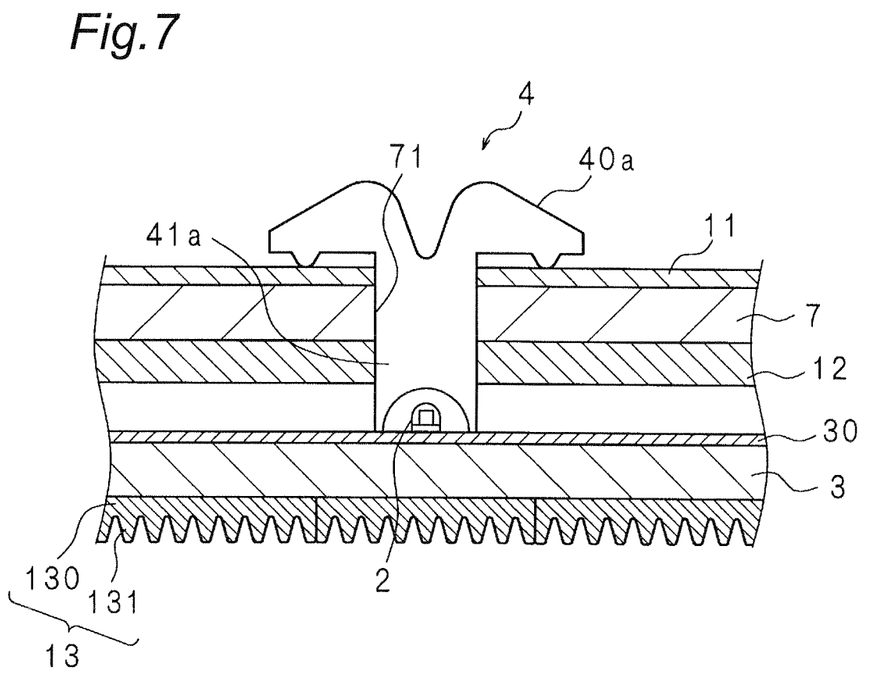
FIG. 7 is an enlarged side cross-sectional view of a part of a display device according to Embodiment 5, the part including an LED and its vicinity.

FIG. 7 is an enlarged side cross-sectional view of a part of a display device 100 according to Embodiment 5, the part including an LED 2 and its vicinity. As shown in FIG. 7, in this embodiment, a radiator 13 is mounted on the rear surface of the substrate 3. As shown in FIG. 7, the radiator 13 includes a flat plate-like base 130 whose attaching surface is in contact with the rear surface of the substrate 3 and a plurality of parallel strip-shaped radiating fins 131 erected perpendicularly from a surface of the base 130 opposite to the attaching surface of the base 130. The radiator 13 is made of high thermally conductive metal such as copper or aluminum. The base 130 and the radiating fins 131 are integrally formed. The base 130 of the radiator 13 may be screwed to the substrate 3 or may be attached to the substrate 3 using attachment members such as hook-like clasps. Preferably, a lubricant having high thermal conductivity, such as silicone grease, may be applied between the substrate 3 and the base 130 of the radiator 13 to fill a gap therebetween.

Heat generated by the LEDs 2 are conducted via the substrate 3 to the radiator 13. Since the radiator 13 has a surface area which is increased by the plurality of radiating fins 131 erected from the base 130, the radiator 13 contacts with air by the increased surface. The heat conducted to the radiator 13 is efficiently released to the air by the increased surface of the radiator 13. That is, due to the radiator 13 mounted to the substrate 3, the substrate 3 is efficiently cooled, so that heat generated from the LEDs 2 is hardly transferred to the housing and increase of the temperature in the diffusion plate 5, the optical sheet laminate 6 and the liquid crystal panel 1 is suppressible. Thus, the display device 100 according to this embodiment is allowed to make the LEDs 2 emit light at a higher intensity to an extent that display defects are not caused, and to further increase the luminance of displayed images, as compared with other embodiments in which no radiator 13 is provided.

Figure 8:
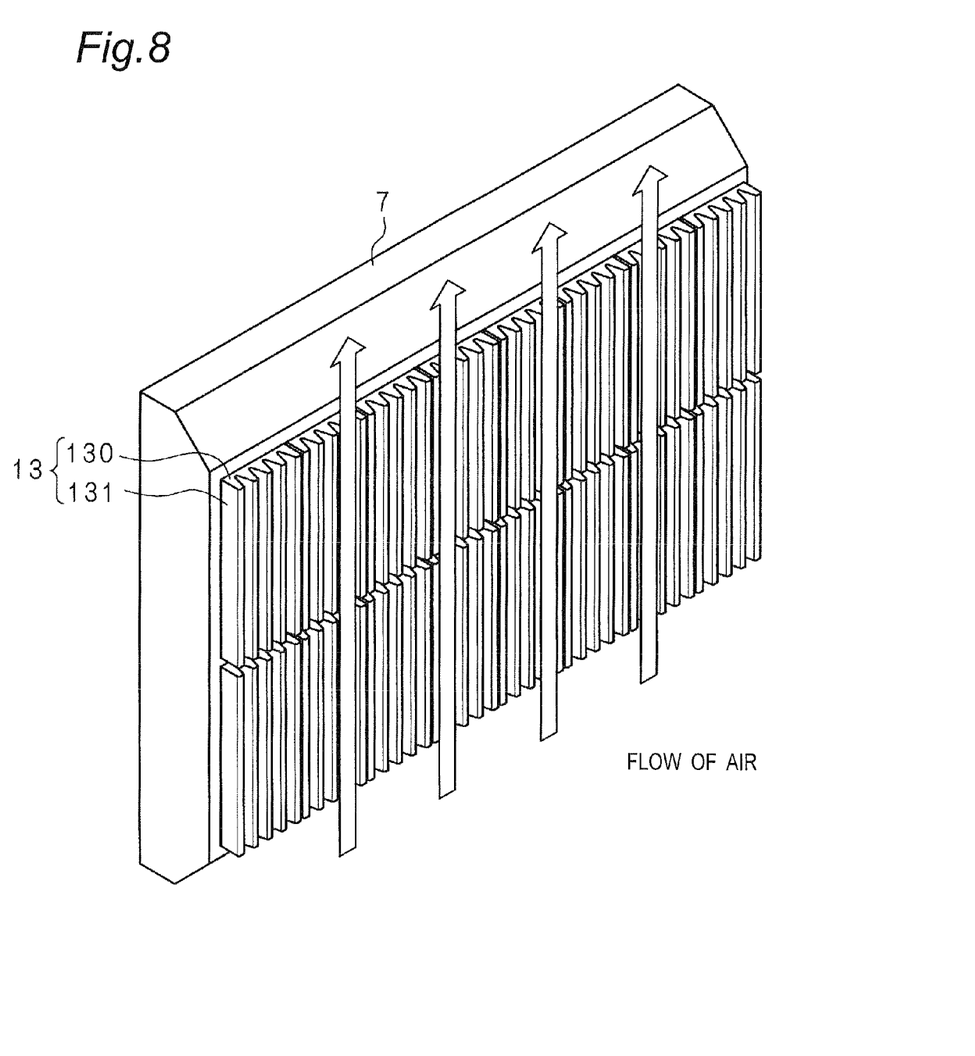
FIG. 8 is a perspective view showing a back side of a back chassis of the display device according to Embodiment 5.
Figure 9:
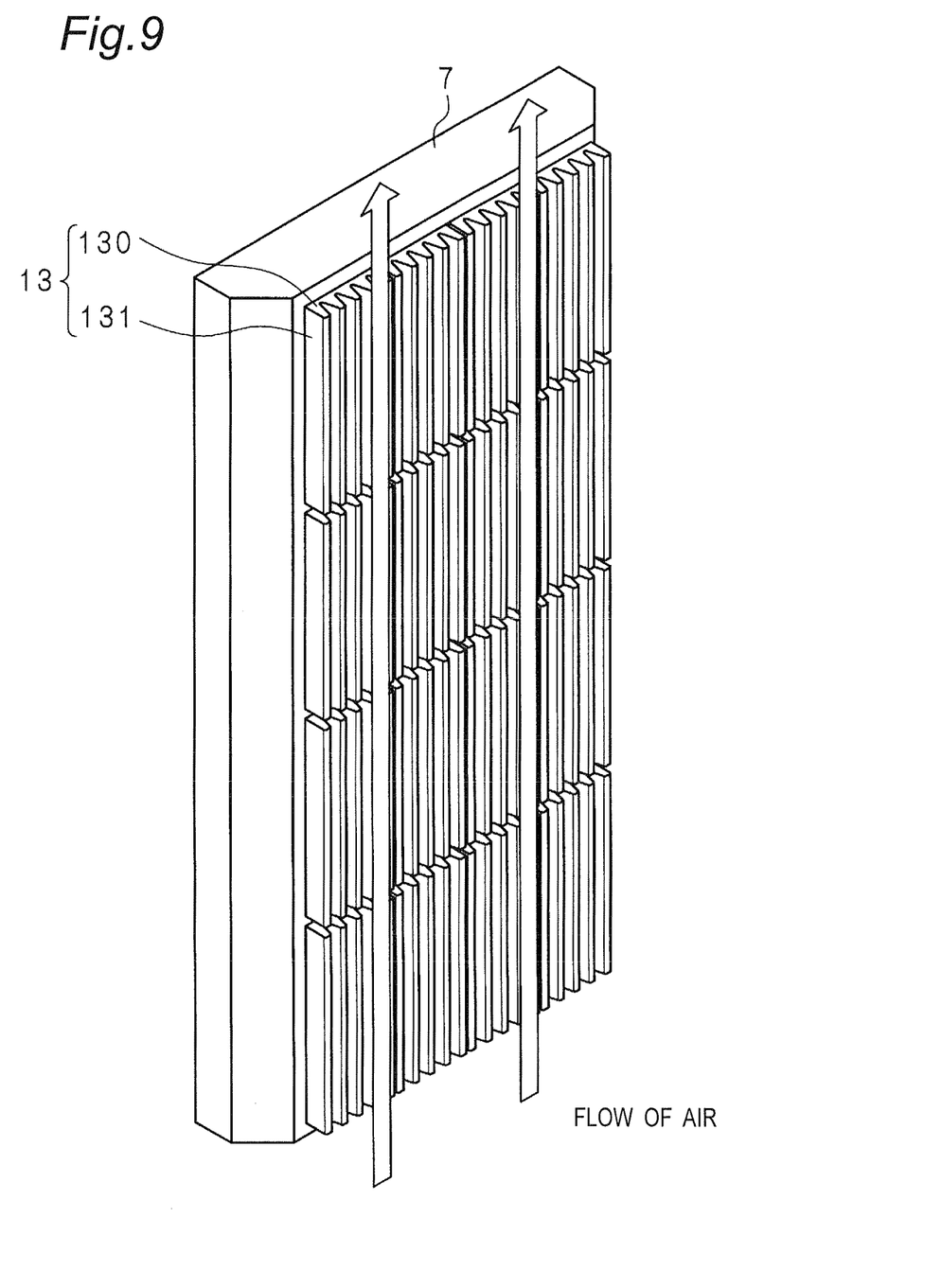
FIG. 9 is another perspective view showing the back side of the back chassis of the display device according to Embodiment 5.

FIGS. 8 and 9 are perspective views showing a back side of the back chassis 7 of the display device according to Embodiment 5. In FIG. 8, the radiator 13 is mounted such that the radiating fins 13 extend in a direction in which shorter sides of the display device 100 extend (which direction will be referred to as a "shorter side direction" below). The display device 100 is installed in landscape orientation such that the shorter side direction is a vertical direction. In FIG. 9, the radiator 13 is mounted such that the radiating fins 13 extend in a direction in which longer sides of the display device 100 extend (which direction will be referred to as a "longer side direction" below). The display device 100 is installed in portrait orientation such that the longer side direction is a vertical direction.

In both examples shown in FIGS. 8 and 9, the radiating fins 131 extend vertically, so that air expanded by being heated by heat released from the radiator 13 is raised by buoyancy through spaces between the radiating fins 131 and then cold air in the atmosphere flows into the spaces between the radiating fins 131. Such air circulation allows the heated air to be replaced with the cold air to thereby efficiently cool the substrate 3. For this reason, the display device 100 of this embodiment is preferably installed such that the radiating fins 131 extend vertically.

The other configurations of this embodiment are same as or similar to those of the preceding embodiments and description thereof is omitted here.

(Embodiment 6)

Figure 10:
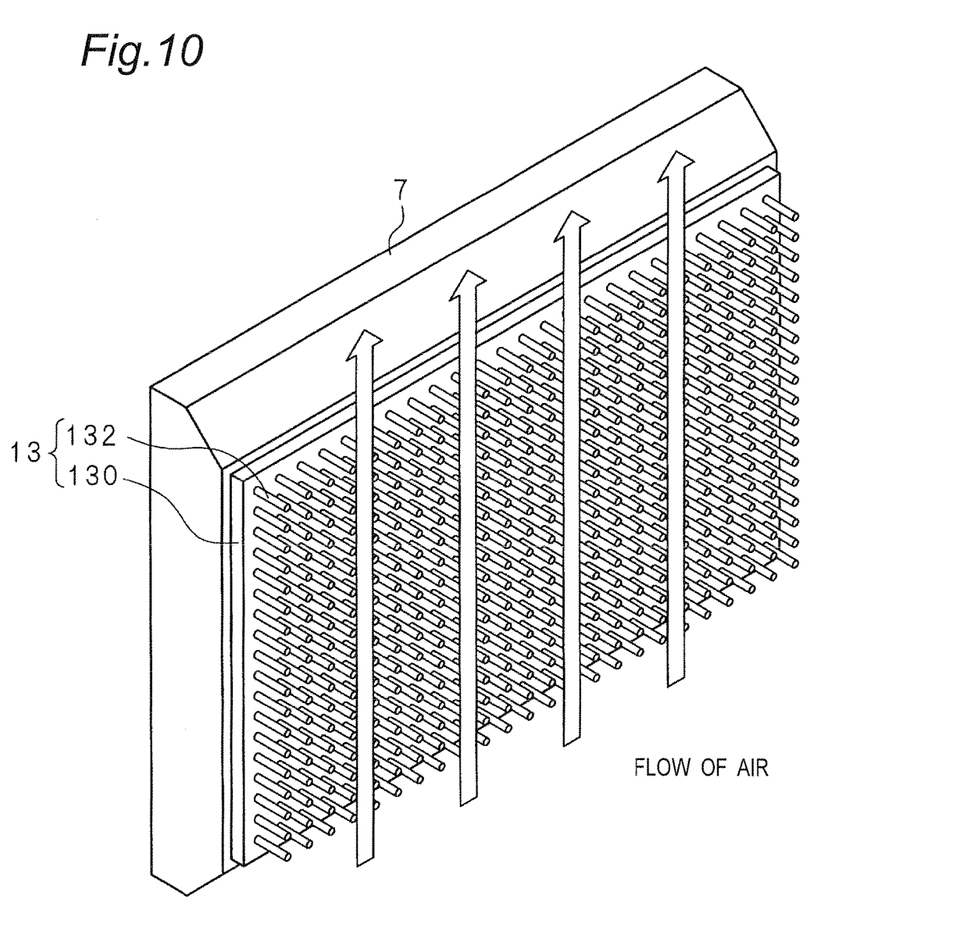
FIG. 10 is a perspective view showing a back side of a back chassis of a display device according to Embodiment 6.

FIG. 10 is a perspective view showing a back side of a back chassis 7 of a display device 100 according to Embodiment 6. In this embodiment, a radiator 13 is attached to the rear surface of the substrate 3 as in Embodiment 5. In this embodiment, however, instead of radiating fins as used in Embodiment 5, the radiator 13 has a plurality of radiating pins 132 that extend perpendicularly from a surface of a base 130 opposite to the attaching surface of the base 130. The radiator 13 is made of high thermally conductive metal such as copper or aluminum, and the base 130 and the radiating pins 131 are integrally formed, as in Embodiment 5.

The radiator 13 is formed in a shape of a pin frog for flower arrangement as shown in FIG. 10, so that air is allowed to flow vertically upwards through between the radiating pins 131 in whatever orientation the display device 100 is installed. That is, there is no restriction on an installation method for efficiently performing heat radiation. Therefore, a user can install the display device 100 in any desired orientation.

The other configurations of this embodiment are same as or similar to those of the preceding embodiments and description thereof is omitted here.

(Embodiment 7)

In a display device 100 according to Embodiment 7, various treatments for enhancing heat radiation may be applied to the rear surface of the substrate 3.

Figure 11:
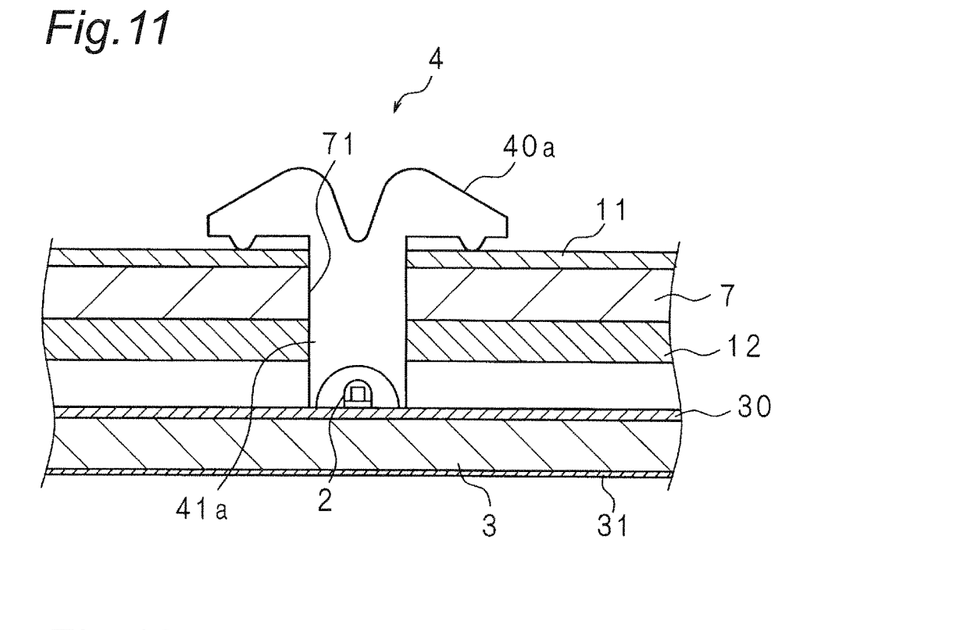
FIG. 11 is an enlarged side cross-sectional view of a part of a display device according to Embodiment 7, the part including an LED and its vicinity.
Figure 12:
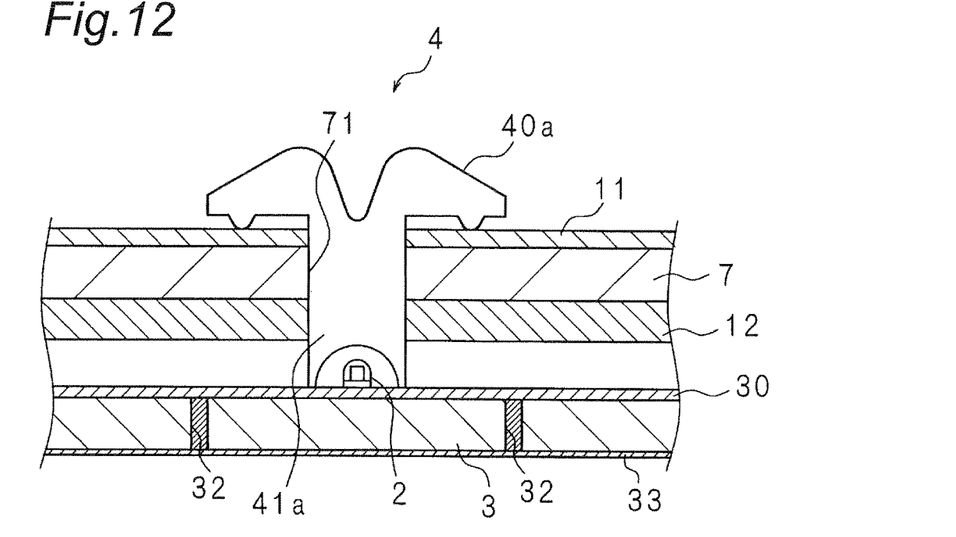
FIG. 12 is an enlarged side cross-sectional view of a part of a display device according to Embodiment 7, the part including an LED and its vicinity.

FIGS. 11 and 12 each are an enlarged side cross-sectional view of a part of a display device 100 according to Embodiment 7, the part including an LED and its vicinity. For example, as shown in FIG. 11, the rear surface of the substrate 3 may be formed with a black painted part 31 which is painted with black paint. Since the black color has a high emissivity, the black painted part 31 allows heat generated from the LEDs 2 to be efficiently radiated from the rear surface of the substrate 3, so that the substrate 3 can be efficiently cooled.

Alternatively, instead of providing the black painted part 31, a black tape may be stuck to the rear surface of the substrate 3. In this case, the substrate 3 can be efficiently cooled as in the case in which the black painted part 31 is provided.

Alternatively, unlike the example of FIG. 11, through holes 32 may be formed in the substrate 3, as shown in FIG. 12, at positions that overlap with a copper foil pattern 30 on the mounting surface of the substrate 3, and filled with a substance having high thermal conductivity. Furthermore, a metal foil pattern 33 of high thermal conductivity, such as a copper or an aluminum foil pattern, may be formed over the substantially entire rear surface of the substrate 3 in such a manner that the metal foil pattern 33 is in contact with the substance having high thermal conductivity in the through holes 32. With such a configuration of the substrate 3, heat generated from the LEDs 2 is first transferred to the copper foil pattern 30 on the mounting surface and then to the metal foil pattern 33 via the substance filled in the through holes 32 and finally efficiently discharged from the metal foil pattern 33.

In this embodiment, heat is efficiently discharged even if the substrate 3 is not formed of a material having high thermal conductivity such as aluminum, for example, but is formed of a material, such as glass epoxy resin, which has low thermal conductivity but is relatively inexpensive. Thus, the substrate 3 can be formed of less expensive material. Accordingly, the display device 100 according to the present embodiment can be manufactured at lower costs as compared to the embodiments in which the substrate is formed of a material having high thermal conductivity; nevertheless the display device 100 can display images at a same luminance as that of the display devices according to such embodiments.

The other configurations of this embodiment are same as or similar to those of the preceding embodiments and description thereof is omitted here.

In the above-described embodiments, several examples have been shown in which a liquid crystal panel is used as the display panel. The present invention is not limited to such examples, but the display panel may be of any type that is able to control the transmittance of light, and the display device may be of any type that includes such a display panel and light sources that irradiate the display panel with light. For example, the present invention is applicable to MEMS (Micro Electro Mechanical Systems) display devices that include a MEMS shutter panel configured to control the transmittance of light by opening and closing shutters using the MEMS, and light sources for irradiating the MEMS shutter panel with light.

It should be understood that the embodiments disclosed herein are only illustrative and not limitative in every respect. The scope of the present invention is defined by the scope of the following claims, rather than the description above, and is intended to include any modifications within the scope and meaning equivalent to the scope of the claims.

REFERENCE SIGNS LIST 100 display device
200 backlight (lighting device)
1 liquid crystal panel (display panel)
2 LED
3 substrate
30 copper foil pattern
31 black painted part
32 through hole
33 metal foil pattern
4 guide and diffusion lens
40a, 40b, 40c, 40d diffusion lens parts
41a, 41d light guide parts
5 diffusion plate
6 optical sheet laminate
7 back chassis
70 bottom part
71 through hole
8 panel chassis
9 bezel
10 housing
11 reflection sheet
12 heat insulating material
13 radiator
130 base
131 radiating fin
132 radiating pin

What is claimed is:

1. A lighting device comprising:
a housing including a bottom portion and an opening, the bottom portion including through holes;
a substrate including light sources mounted on one surface thereof, the substrate being outside of the bottom portion of the housing such that light emitted from the light sources is passed through respective through holes and radiated to the opening of the housing;
light guide portions, each of which has a cylindrical shape, provided through the through holes of the bottom portion of the housing to guide the light emitted from the light sources, respectively; and
diffusion lenses inside of the housing that diffuse light guided by the light guide portions, respectively, wherein
each of the light guide portions is hollow and reflects light by an inner surface thereof to guide reflected light to an associated diffusion lens,
the diffusion lenses have a diameter that is larger than a diameter of the through holes, and
the diffusion lenses cover the bottom portion around the through holes.

2. The lighting device according to claim 1, wherein an outer peripheral portion of each of the diffusion lenses is in contact with the bottom portion of the housing.

3. The lighting device according to claim 1, wherein the light guide portions and the diffusion lenses are defined as separate members.

4. The lighting device according to claim 1, further comprising:
a heat insulating material provided between the housing and the substrate.

5. The lighting device according to claim 1, further comprising:
a radiator that is in contact with another surface of the substrate opposite to the one surface of the substrate.

6. The lighting device according to claim 5, wherein the radiator includes a base in contact with the substrate, and radiating fins defined on the base in an erected manner.

7. The lighting device according to claim 5, wherein the radiator includes a base in contact with the substrate, and radiating pins defined on the base in an erected manner.

8. The lighting device according to claim 1, wherein another surface of the substrate opposite to the one surface of the substrate includes a heat radiation enhancing treatment.

9. The lighting device according to claim 1, wherein the substrate is made of metal.

10. A display device comprising:
the lighting device according to claim 1; and
a display panel provided to close the opening of the housing of the lighting device and control transmittance of light emitted from the light sources to display an image.

11. The lighting device according to claim 1, further comprising an optical sheet that aligns the light emitted from the light sources and diffused by the diffusion lenses to a direction normal to the optical sheet.

12. The lighting device according to claim 1, wherein the diffusion lenses each include a central recess portion.

* * * * *